(12) United States Patent
Lee (10) Patent No.: US 7,944,088 B2
(45) Date of Patent: May 17, 2011

(54) BATTERY BACKUP DEVICE (75) Inventor: Jai Sung Lee, Gyeonggi-Do (KR)

(73) Assignee: Sam Duyka, South Lake, TX (US)

( * ) Notice: Subject to any disclaimer, the term of this patent is extended or adjusted under 35 U.S.C. 154(b) by 414 days.

(21) Appl. No.: 12/075,406

(22) Filed: Mar. 11, 2008

(65) Prior Publication Data

US 2009/0121551 A1 May 14, 2009

(30) Foreign Application Priority Data

Nov. 11, 2007 (KR) .......................... 10-2007-0114604
Nov. 28, 2007 (KR) .......................... 10-2007-0122270

(51) Int. Cl.
*H02J 7/00* (2006.01)
(52) U.S. Cl. .......................................... 307/66; 307/64
(58) Field of Classification Search .............. 307/64–66; 710/74
See application file for complete search history.

(56) References Cited

U.S. PATENT DOCUMENTS

| 6,130,518 | A | * | 10/2000 | Gabehart et al. | ............... | 320/103 |
| 2006/0089171 | A1 | * | 4/2006 | Yoo et al. | ....................... | 455/557 |
| 2007/0194626 | A1 | * | 8/2007 | Eager et al. | ....................... | 307/66 |

OTHER PUBLICATIONS

Translated abstract and one Figure from Back, Derwent Acc No. 2008-B2339, based on an abstract from KR 2007032844, published Mar. 23, 2007.*

* cited by examiner

*Primary Examiner* — Fritz M Fleming
(74) *Attorney, Agent, or Firm* — SLD Marketing Group (57) ABSTRACT

A battery backup device is provided. The battery backup device includes a first connector; a second connector; a data line which transmits data provided from an external source via the first connector to the second connector; a storage unit which is connected to the data line and selectively stores the data; and a charging unit which receives and becomes charged with a first power supply voltage provided from the external source via the first connector, selectively adjusts a voltage level of the first power supply voltage, and outputs a second power supply voltage to the second connector.

8 Claims, 7 Drawing Sheets

BATTERY BACKUP DEVICE

This application claims priority from Korean Patent Application No. 10-2007-0114604 filed on Nov. 11, 2007 and Korean Patent Application No. 10-2007-0122270 filed on Nov. 28, 2007 in the Korean Intellectual Property Office, the disclosures of which are incorporated herein by reference in their entirety.

BACKGROUND OF THE INVENTION

1. Field of the Invention

The present invention relates to a battery backup device, and more particularly, to a battery backup device having data link and storage functions.

2. Description of the Related Art

A portable digital device or a mobile device can now exchange various contents with a computer through data communication. In this case, the portable digital device or the mobile device is connected to the computer by a connector such as a universal serial bus (USB) connector. However, since a battery of the portable digital device or the mobile device is used up in a short period of time, a battery backup device is being developed to charge the battery whenever necessary.

SUMMARY OF THE INVENTION

Aspects of the present invention provide a battery backup device having data link and storage functions.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a battery backup device including a first connector; a second connector; a data line which transmits data provided from an external source via the first connector to the second connector; a storage unit which is connected to the data line and selectively stores the data; and a charging unit which receives and becomes charged with a first power supply voltage provided from the external source via the first connector, selectively adjusts a voltage level of the first power supply voltage, and outputs a second power supply voltage to the second connector.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals in the drawings denote like elements, and thus their description will be omitted.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
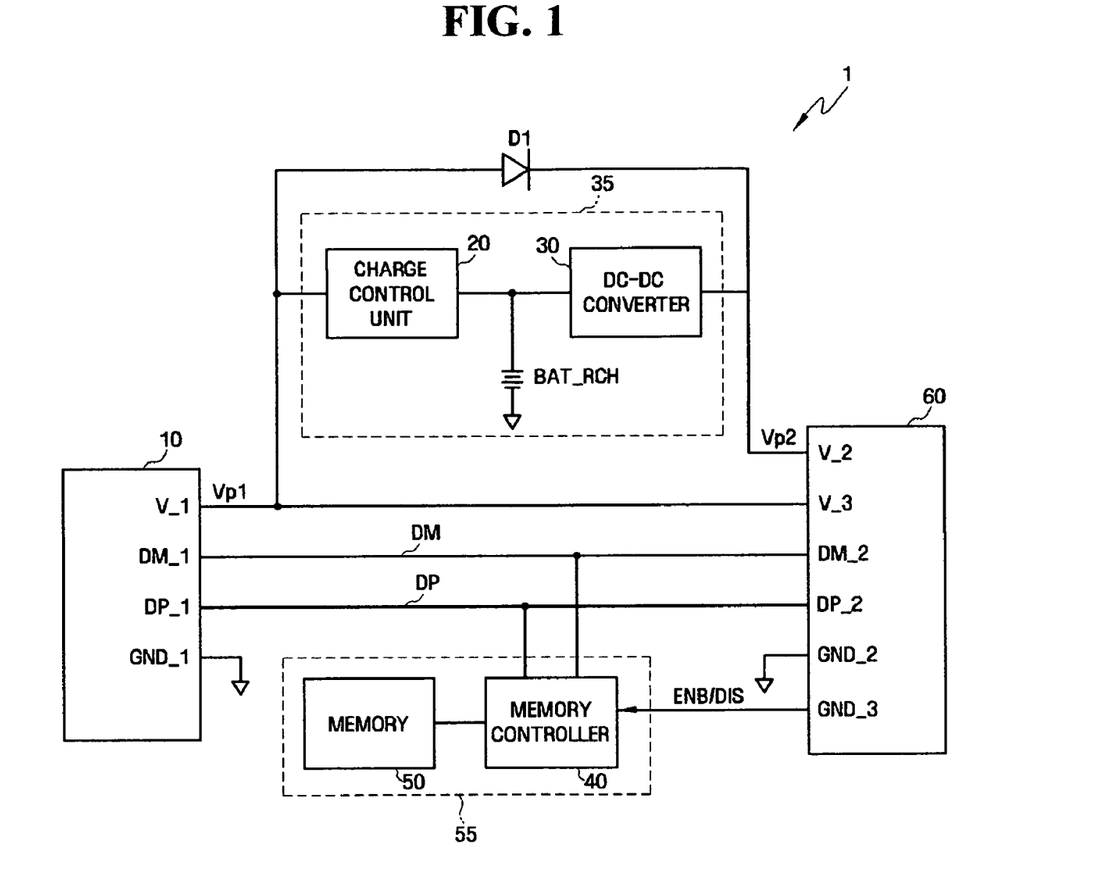
FIG. 1 is a block diagram of a battery backup device according to an exemplary embodiment of the present invention.
Figure 2:
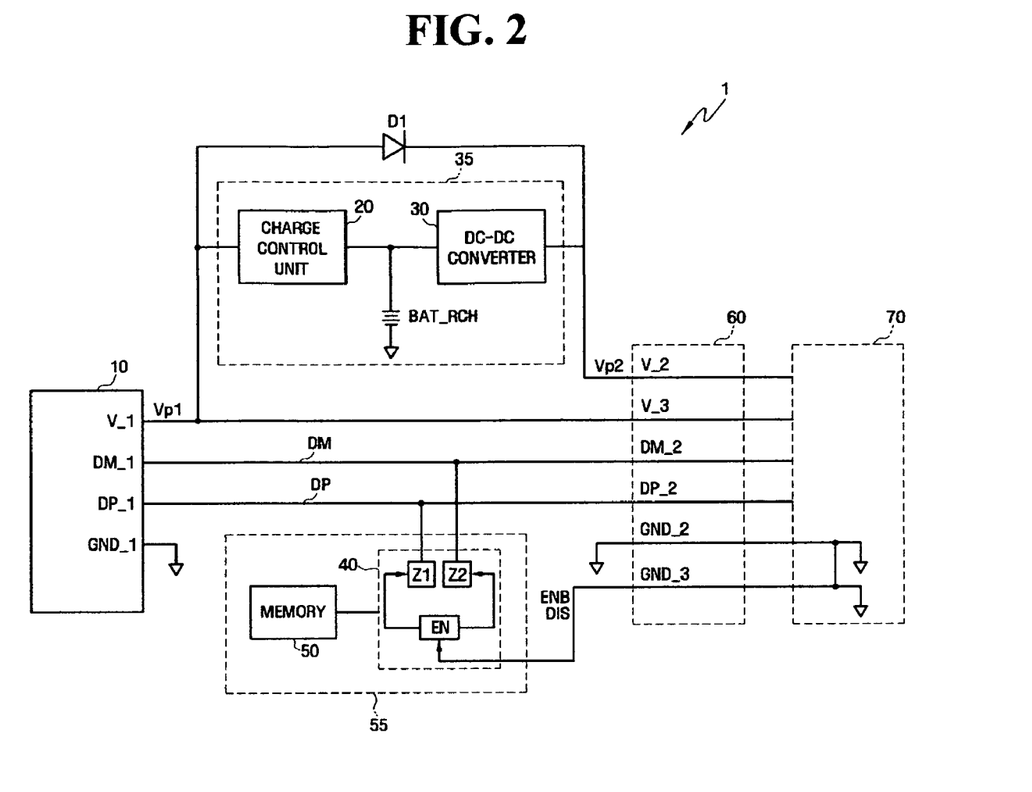
FIG. 2 is a conceptual diagram for explaining the operations of a storage unit and a second connector shown in FIG. 1.
Figure 3:
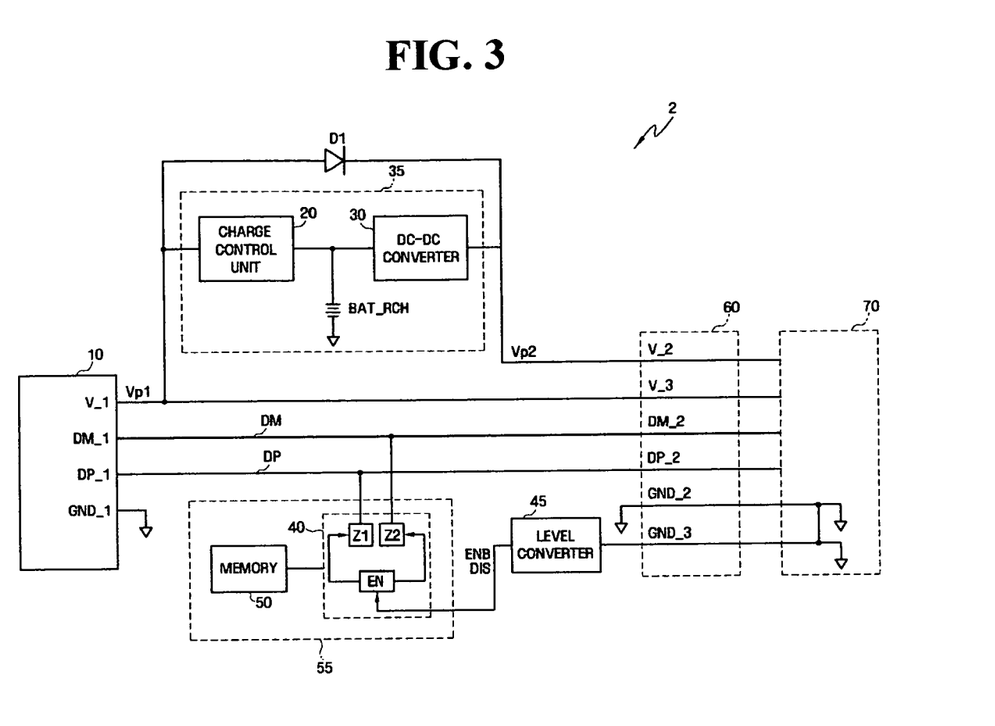
FIG. 3 is a block diagram of a battery backup device according to another exemplary embodiment of the present invention.

A battery backup device according to an exemplary embodiment of the present invention will be described with reference to FIGS. 1 through 3. FIG. 1 is a block diagram of a battery backup device 1 according to an exemplary embodiment of the present invention. FIG. 2 is a conceptual diagram for explaining the operations of a storage unit 55 and a second connector 60 shown in FIG. 1. FIG. 3 is a block diagram of a modified version of the battery backup device 1 shown in FIG. 1.

Referring to FIG. 1, the battery backup device 1 according to the present embodiment includes a first connector 10, the second connector 60, data lines DM and DP, a charging unit 35, and the storage unit 55. The battery backup device 1 can link and store data, read data from a memory card, and backup a battery. Hereinafter, components, operations and functions of the battery backup device 1 will be described in detail.

First of all, to store data and read data from a memory card, the battery backup device 1 is connected to an external device (not shown) by the first connector 10. Here, the second connector 60 may not be connected to another external device (not shown), for example, a mobile device. It will be assumed hereinafter that the external device (not shown) connected to the first connector 10 is a computer. However, the present invention is not limited thereto.

The first connector 10 includes a first power supply voltage pin V_1, first data pins DM_1 and DP_1, and a first ground pin GND_1. The battery backup device 1 receives data from a computer (not shown) through the first data lines DM_1 and DP_1 of the first connector 10. The data input through the first data pins DM_1 and DP_1 is transmitted to the data lines DM and DP. In addition, the battery backup device 1 receives a first power supply voltage Vp1 from the computer (not shown) through the first power supply voltage pin V_1 of the first connector 10. A ground voltage may be applied to the first ground pin GND_1. The first connector 10 may be a universal serial bus (USB) connector.

The storage unit 55 is connected to the data lines DM and DP and may selectively store data provided from the computer (not shown). For example, the storage unit 55 may store data only when an external device (not shown) is not connected to the second connector 60. The storage unit 55 includes a memory 50 and a memory controller 40.

The memory controller 40 is connected to the data lines DM and DP. The memory controller 40 is enabled in response to an enable signal ENB and thus receives data from the data lines DM and DP and stores the data in the memory 50. In addition, the memory controller 40 is disabled in response to a disable signal DIS and thus does not receive data from the data lines DM and DP. The enable signal ENB or the disable signal DIS may be provided from the second connector 60. The second connector 60 outputs the disable signal DIS when an external device (not shown) is connected thereto and outputs the enable signal ENB when an external device (not shown) is not connected thereto, which will now be described in more detail.

Referring to FIG. 2, the second connector 60 includes second and third ground pins GND_2 and GND_3. A ground voltage is applied to the second ground pin GND_2, and the third ground pin GND_3 is connected to the memory controller 40. In this case, the second connector 60 may be a standard connector used for digital devices.

When an external device 70, e.g., a mobile device, is connected to the second connector 60, the second and third ground pins GND_2 and GND_3 are electrically connected to each other as shown in FIG. 2. Thus, the third ground pin GND_3 provides the disable signal DIS in a low level to the memory controller 40. When the memory controller 40 receives the disable signal DIS in the low level through an enable terminal EN thereof, impedances Z1 and Z2 connected to the data lines DP and DM, respectively, become infinite. As a result, no data is input to the storage unit 55. In this state, the external device 70 is connected to the computer (not shown) which is connected to the first connector 10, and the battery backup device 1 performs a data link function which will be described later.

When the external device 70, e.g., a mobile device, is disconnected from the second connector 60, the third ground pin GND_3 is electrically disconnected from the second ground pin GND_2 and thus does not provide the disable signal DIS in the low level. In this case, the memory controller 40 is enabled to receive data from the data lines DM and DP and store the data in the memory 50. That is, the battery backup device 1 performs a data storage operation.

In addition, the battery backup device 1 may transmit data stored in the memory 50 to the external computer (not shown) via the data lines DM and DP and the first data pins DM_1 and DP_1.

The memory 50 may be a built-in memory which is fixedly included in the battery backup device 1 or an external memory which can be inserted into or removed from the battery backup device 1. If the memory 50 is an external memory, it may be a secure digital (SD) card, a smart media (SM) card, a T-flash memory card, a multimedia card (MMC), or the like.

In summary, the battery backup device 1 includes the storage unit 55 and stores or reads data in/from the memory 50 by receiving and storing data from an external computer (not shown) connected thereto by the first connector 10 or providing data stored in the memory 50 to the external computer (not shown).

Next, a data link function of the battery backup device 1 will be described with reference to FIG. 1. For the data link function, the battery backup device 1 is connected to a first external device by the first connector 10 and connected to a second external device by the second connector 60. It will be assumed hereinafter that the first external device is a computer (not shown) and that the second external device is a mobile device (not shown). However, the present invention is not limited thereto.

The second connector 60 includes second data pins DM_2 and DP_2 (or data pads), and the second data pins DM_2 and DP_2 are connected to the data lines DM and DP, respectively. Therefore, the battery backup device 1 is connected between the computer (not shown) which is connected to the first connector 10 and the mobile device (not shown) which is connected to the second connector 60 to perform the data link function. That is, the battery backup device 1 may receive data from the computer (not shown) via the first connector 10, transmit the data to the second connector 60 via the data lines DM and DP, and then transmit the data to the mobile device (not shown) via the second connector 60. Alternatively, the battery backup device 1 may receive data from the mobile device (not shown) via the second connector 60, transmit the data to the first connector 10 via the data lines DM and DP, and then transmit the data to the computer (not shown) via the first connector 10. Here, since the mobile device (not shown) is connected to the second connector 60 as described above, the storage unit 55 may be disabled and thus may not store data in the data lines DM and DP.

To back up a battery, the battery backup device 1 is connected to an external device (not shown), for example, a mobile device, by the second connector 60 as shown in FIG. 1.

The charging unit 35 includes a rechargeable battery BAT_RCH and a charge control unit 20 which charges the rechargeable battery BAT_RCH with the first power supply voltage Vp1 provided from the first connector 10. When an external device (not shown), e.g., a computer, is connected to the first connector 10, the first power supply voltage Vp1 is provided through the first power supply voltage pin V1. The charge control unit 20 receives the first power supply voltage Vp1 and charges the rechargeable battery BAT_RCH with the first power supply voltage Vp1. In this case, the rechargeable battery BAT_RCH can be inserted into or removed from the battery backup device 1.

The charging unit 35 may further include a direct current (DC)-DC converter 30. The DC-DC converter 30 selectively controls the first power supply voltage Vp1 that charges the rechargeable battery BAT_RCH and outputs a second power supply voltage Vp2. For example, the DC-DC converter 30 reduces or increases the first power supply voltage Vp1 if the rechargeable battery BAT_RCH and provides the reduced or increased first power supply voltage Vp1 as the second power supply voltage Vp2. That is, when a voltage required for a mobile device (not shown) is different from the first power supply voltage Vp1 of the rechargeable batter BAT_RCH, the DC-DC converter 30 reduces or increases the first power supply voltage Vp1 of the rechargeable battery BAT_RCH to the voltage required for the mobile device (not shown) and outputs the reduced or increased first power supply voltage Vp1 to the mobile device (not shown) as the second power supply voltage Vp2. When the voltage required for the mobile device (not shown) is equal to the first power supply voltage Vp1?) of the rechargeable battery BAT_RCH, the DC-DC converter 30 may not increase or reduce the first power supply voltage Vp1 that charges the rechargeable battery BAT_RCH. The DC-DC converter 30 may be omitted when necessary.

As described above, the charging unit 35 receives and becomes charged with the first power supply voltage Vp1 from an external source and provides the second power supply voltage Vp2 to an external mobile device (not shown) via the second power supply voltage pin V_2 of the second connector 60. Therefore, the external device (not shown) connected to the second connector 60 can back up its battery.

As shown in FIGS. 1, 2 and 3, the charging unit 35 can include a charge control unit 20, a rechargeable battery (BAT_RCH) and a DC-DC converter 30. The charging unit 35 can receive power from the connector 10. The charge control unit 20 can output power to charge the rechargeable battery (BAT_RCH) and output power to the DC-DC converter 30. When power from the connector 10 is present, the DC-DC converter 30 can adjust an output voltage from the charge control unit 20 and when power from the connector 10 is not present, the DC-DC converter 30 can adjust an output voltage of the rechargeable battery (BAT_RCH).

When the battery backup device 1 is connected to both a computer (not shown) and a mobile device (not shown) by the first and second connectors 10 and 60, respectively, the first power supply voltage Vp1 input from the computer (not shown) may be output to the mobile device (not shown) as the second power supply voltage Vp2. That is, the battery backup device 1 includes a diode D1 to receive the first power supply voltage Vp1 and output the second power supply voltage Vp2. Alternatively, as shown in FIG. 1, the second connector 60 may further include a third power supply voltage pin V_3, which is directly connected to the first power supply voltage pin V_1, and provide the first power supply voltage Vp1, as it is, to the mobile device (not shown). The diode D1 can be included in the charging unit 35. While one diode D1 is shown in FIG. 1, the present invention is not limited thereto.

A battery backup device according to another exemplary embodiment of the present invention will now be described with reference to FIG. 3. FIG. 3 is a block diagram of a battery backup device 2 according to another exemplary embodiment of the present invention. Elements substantially identical to those of the previous embodiment shown in FIG. 1 are indicated by like reference numerals, and thus their description will be omitted.

Referring to FIG. 3, the battery backup device 2 may further include a level converter 45. Therefore, when a mobile device 70 is connected to a second connector 60, the level converter 45 receives a disable signal DIS in a low level from a third ground pin GND_3 and provides the disable signal DIS in the low level to a memory controller 40. When the mobile device 70 is disconnected from the second connector 60, the level converter 45 can provide an enable signal ENB to the memory controller 40 even if the third ground pin GND_3 floats.

The level converter 45 inversely converts a logic level of the enable signal ENB or the disable signal DIS provided from the third ground pin GND_3 to enable or disable the memory controller 40 and transmits the enable signal ENB or the disable signal DIS with the inversely converted logic level to the memory controller 40.

Therefore, the battery backup device 2 can selectively perform the data storage function according to whether the mobile device 70 is connected to the second connector 60.

Figure 4:
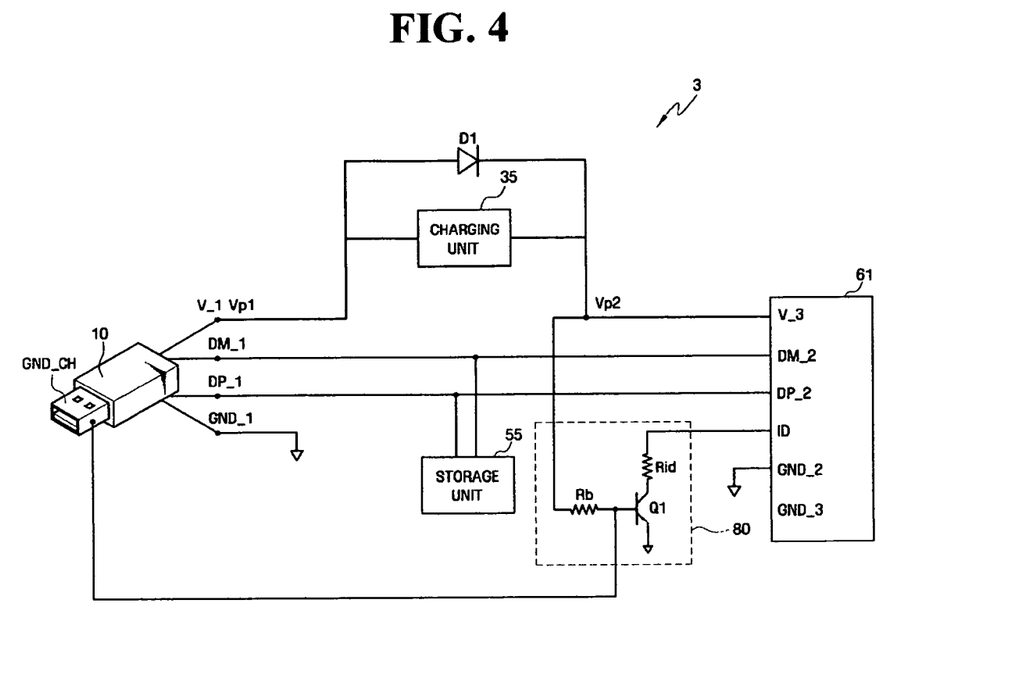
FIG. 4 is a circuit diagram of a battery backup device according to another exemplary embodiment of the present invention.

A battery backup device according to another exemplary embodiment of the present invention will now be described with reference to FIG. 4. FIG. 4 is a circuit diagram of a battery backup device 3 according to another exemplary embodiment of the present invention. While a first connector 10 shown in FIG. 4 is a USB connector, the present invention is not limited thereto.

Referring to FIG. 4, the battery backup device 3 further includes a connection information providing unit 80 which outputs connection information indicating whether the first connector 10 is connected to an external device (not shown) to a connection information terminal ID of a second connector 61. The connection information providing unit 80 may include a first switching device Q1, a first base resistor Rb and an ID resistor Rid. The battery backup device 3 may be used with an external device (not shown) which can recognize whether it is connected to a charger having a battery backup function or a computer (not shown).

When an external device (not shown), for example, a mobile device, is connected to the second connector 60 and when another external device (not shown), for example, a computer, is not connected to the first connector 10, that is, when a battery of the mobile device (not shown) is to be backed up, the connection information providing unit 80 informs the mobile device (not shown) about this connection information.

More specifically, a base of the first switching device Q1 may be connected to a chassis ground GND_CH of the first connector 10. The first base resistor Rb provides a second power supply voltage Vp2 to the base of the first switching device Q1, and the ID resistor Rid is connected to the connection information terminal ID of the second connector 61.

When the chassis ground GND_CH is connected to the computer (not shown), a ground voltage is applied to the chassis ground GND_CH. When the chassis ground GND_CH is not connected to the computer (not shown), the ground voltage is not applied to the chassis ground GND_CH. Therefore, when the computer (not shown) is not connected to the first connector 10, the second power supply voltage Vp2 is provided to the base of the first switching device Q1. Consequently, the first switching device Q1 is turned on. Accordingly, the ID resistor Rid is connected to the ground voltage, and the connection information terminal ID conducts electric current. When electric current flows through the connection information terminal ID, the mobile device (not shown) connected to the second connector 61 may recognize that it is not connected to the computer (not shown) but to a charging unit 35 and back up its battery.

Next, when the computer (not shown) is connected to the first connector 10, the ground voltage is applied to the chassis ground GND_CH and then to the base of the first switching device Q1. Accordingly, the first switching device Q1 is turned off, and the ID resistor Rid floats. When the connection information terminal ID floats, the mobile device (not shown) connected to the second connector 61 may recognize that it is connected to the computer (not shown) and thus exchange data with the computer (not shown). In addition, the mobile device may back up its battery using the computer (not shown).

Figure 5:
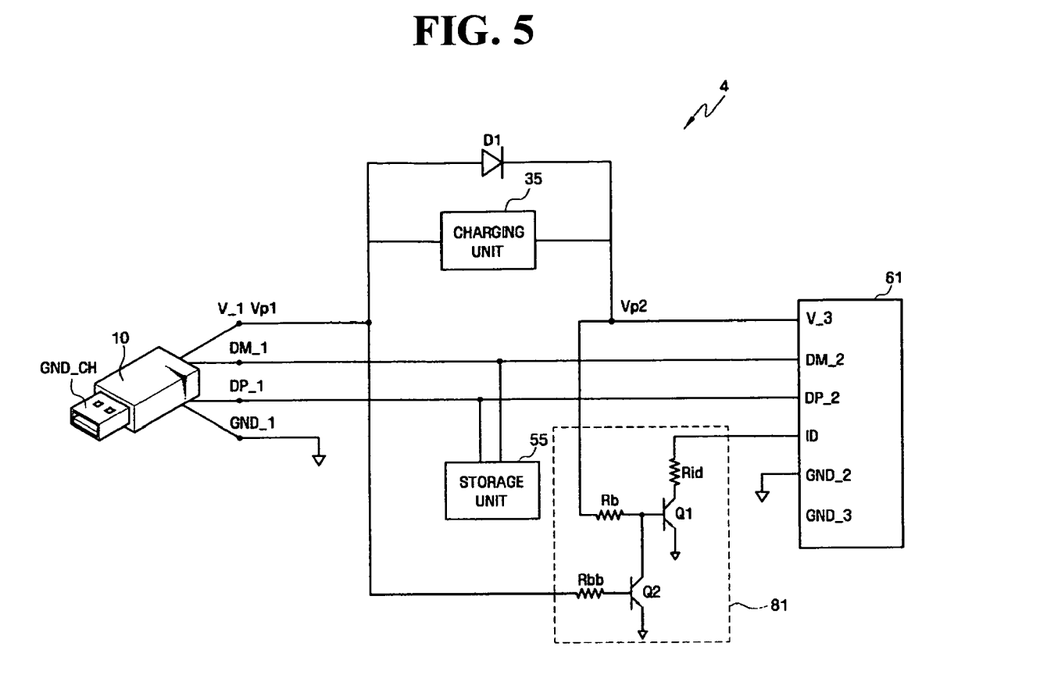
FIG. 5 is a circuit diagram of a battery backup device according to another exemplary embodiment of the present invention.

A battery backup device according to another exemplary embodiment of the present invention will now be described with reference to FIG. 5. FIG. 5 is a circuit diagram of a battery backup device 4 according to another exemplary embodiment of the present invention. Referring to FIG. 5, unlike the connection information providing unit 80 according to the previous embodiment shown in FIG. 4, a connection information providing unit 81 of the battery backup device 4 according to the present embodiment further includes a second switching device Q2 and a second base resistor Rbb. The second base resistor Rbb of the second switching device Q2 is connected to a first power supply voltage pin V_1 of a first connector 10, and a collector of the second switching device Q2 is connected to a base of the first switching device Q1.

When a computer (not shown) is not connected to the first connector 10, a first power supply voltage Vp1 is not provided to a base of the second switching device Q2. Thus, the second switching device Q2 is turned off. Accordingly, a second power supply voltage Vp2 is provided to the base of the first switching device Q1, and the first switching device Q1 is turned on. Thus, electric current flows through a connection information terminal ID of a second connector 61.

Next, when the computer (not shown) is connected to the first connector 10, the first power supply voltage Vp1 is provided to the second switching device Q2. Then, the second switching device Q2 is tuned on and pulls downs a base voltage of the first switching device Q1. Accordingly, the first switching device Q1 is turned off, and the connection information terminal ID floats.

Figure 6:
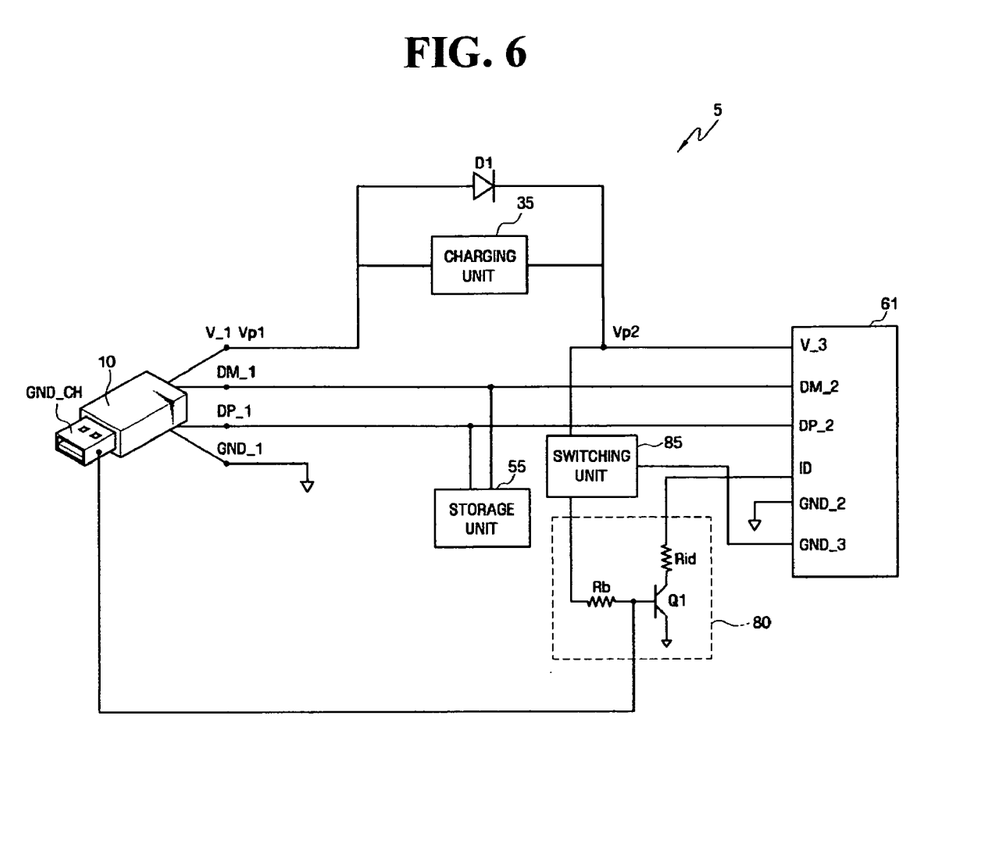
FIG. 6 is a circuit diagram of a battery backup device according to another exemplary embodiment of the present invention.

A battery backup device according to another exemplary embodiment of the present invention will now be described with reference to FIG. 6. FIG. 6 is a circuit diagram of a battery backup device 5 according to another exemplary embodiment of the present invention. Referring to FIG. 6, the battery backup device 5 further includes a switching unit 85. The switching unit 85 controls a connection information providing unit 80 to output connection information to a connection information terminal ID only when a mobile device (not shown) is connected to a second connector 61.

More specifically, the switching unit 85 is connected to a third ground pin GND_3 and receives a ground voltage from the third ground pin GND_3 only when a mobile device (not shown) is connected to the second connector 61. In addition, only when provided with the ground voltage, the switching unit 85 applies a second power supply voltage Vp2 to a base of a first switching device Q1. In this case, as described above with reference to FIG. 4, the connection information providing unit 80 may output connection information to the mobile device (not shown) via the connection information terminal ID according to whether a computer (not shown) is connected to the first connector 10. Therefore, when the mobile device (not shown) is not connected to the second connector 61, the second power supply voltage Vp2 is not provided to the first switching device Q1. Thus, power consumption can be reduced.

Figure 7:
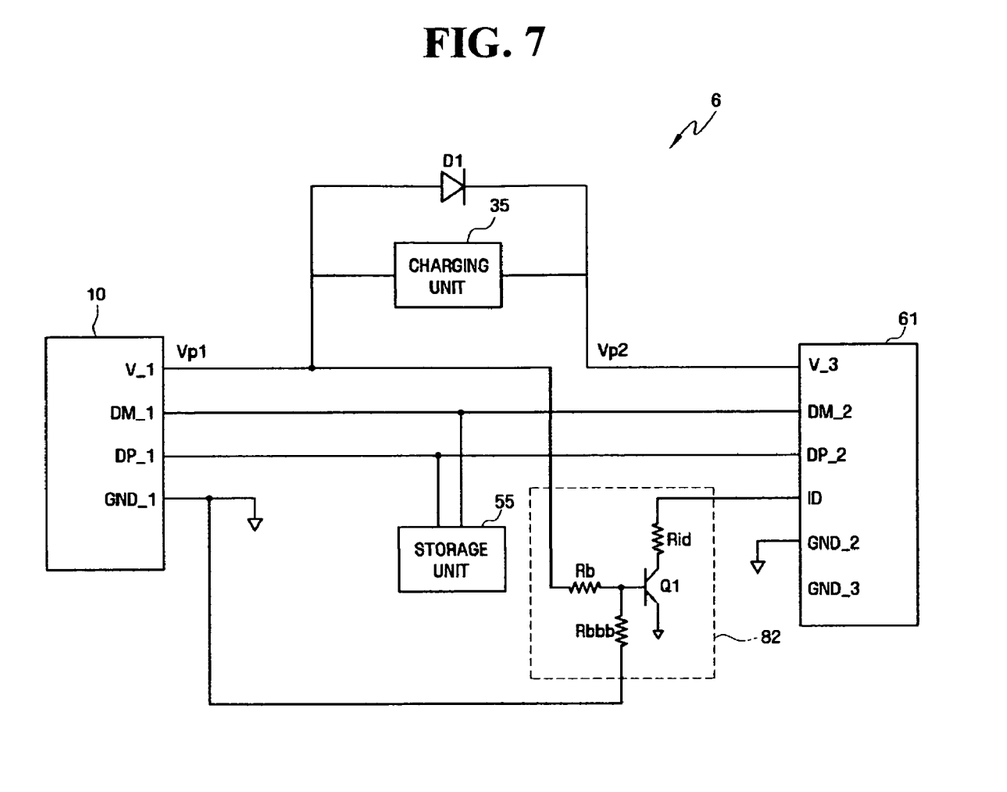
FIG. 7 is a circuit diagram of a battery backup device according to another exemplary embodiment of the present invention.

A battery backup device according to another exemplary embodiment of the present invention will now be described with reference to FIG. 7. FIG. 7 is a circuit diagram of a battery backup device 6 according to another exemplary embodiment of the present invention. Referring to FIG. 7, a connection information providing unit 82 of the battery backup device 6 is connected to a first power supply voltage Vp1 and a first ground pin GND_1. Unlike the previous embodiments, the battery backup device 6 according to the present embodiment can be used when a mobile device (not shown) recognizes that it is connected to a computer (not shown) if electric current flows through a connection information terminal ID and that it is not connected to the computer (not shown) but to a charging unit 35 if the connection information terminal ID floats.

More specifically, when the computer (not shown) is connected to a first connector 10, the first power supply voltage Vp1 is divided by a first base resistor Rb and a third base resistor Rbbb, and the divided first power supply voltage Vp1 is provided to a base of a first switching device Q1. Accordingly, the first switching device Q1 is turned on, and electric current flows through the connection information terminal ID.

When the computer (not shown) is not connected to the first connector 10, a ground voltage is applied to the base of the first switching device Q1. Accordingly, the first switching device Q1 is turned off, and the connection information terminal ID floats.

A battery backup device according to the exemplary embodiments of the present invention described above can link and store data, read data from a memory card, and back up a battery, thereby enhancing user convenience.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A battery backup device comprising:
    a first connector;
    a second connector;
    a data line which transmits data provided from an external source via the first connector to the second connector;
    a storage unit which is connected to the data line and selectively stores the data; and
    a charging unit which receives and becomes charged with a first power supply voltage provided from the external source via the first connector
    wherein the charging unit comprises
        a rechargeable battery;
        a charge control unit to provide an output voltage to charge the rechargeable battery;
        a DC-DC converter that selectively adjusts the output voltage of the charge control unit or an output voltage of the rechargeable battery and that provides an adjusted voltage as a second power supply voltage to the second connector.

2. The device of claim 1, wherein the first connector is a universal serial bus (USB) connector.

3. The device of claim 1, wherein the storage unit is enabled when an external device is not connected to the second connector and stores the data and disabled when the external device is connected to the second connector and does not store the data.

4. The device of claim 3, wherein the storage unit comprises:
a memory; and
a memory controller which is enabled in response to an enable signal to store the data in the memory and disabled in response to a disable signal,
wherein the second connector outputs the enable signal to the memory controller when the external device is not connected to the second connector and outputs the disable signal when the external device is connected to the second connector.

5. The device of claim 1, wherein the charging unit further comprises a diode which receives the first power supply voltage and outputs the second power supply voltage.

6. The device of claim 1, further comprising a connection information providing unit which outputs connection information indicating whether an external device is connected to the first connector to a connection information terminal included in the second connector.

7. The device of claim 6, wherein the connection information providing unit comprises a switching device which is turned off when the external device is connected to the first connector and floats the connection information terminal and which is turned on when the external device is not connected to the first connector and flows electric current through the connection information terminal.

8. The device of claim 1, further comprising a connection information providing unit which outputs connection information indicating whether a first external device is connected to the first connector when a second external device is connected to the second connector to a connection information terminal included in the second connector.

* * * * *